W. R. GILMORE.
WHEEL AND PROCESS OF MAKING SAME.
APPLICATION FILED OCT. 10, 1919.

1,428,954.

Patented Sept. 12, 1922.

Inventor
William R. Gilmore
By: Parker Carter Attys.

Patented Sept. 12, 1922.

1,428,954

UNITED STATES PATENT OFFICE.

WILLIAM R. GILMORE, OF BENTON HARBOR, MICHIGAN, ASSIGNOR TO SUPERIOR STEEL CASTINGS COMPANY, OF BENTON HARBOR, MICHIGAN, A CORPORATION OF MICHIGAN.

WHEEL AND PROCESS OF MAKING SAME.

Application filed October 10, 1919. Serial No. 329,826.

*To all whom it may concern:*

Be it known that I, WILLIAM R. GILMORE, a citizen of the United States, residing at Benton Harbor, in the county of Berrien and State of Michigan, have invented a certain new and useful Improvement in Wheels and Processes of Making Same, of which the following is a specification.

This invention relates to improvements in wheels and the process of making same and has for its object to provide a new and improved wheel and process of manufacturing such wheel.

When wheels are made of metal and cast with the spokes integral with the rim and hub weakness develops at the points where the spokes engage the rim and the hub, such weakness being due to uneven cooling of the metal and irregular shrinkage thereof during such cooling, thereby producing excessive internal stresses at these points.

One of the objects of my invention is to provide a cast wheel and a process of making same which shall obviate this difficulty and at the same time produce a wheel which is lighter and of greater strength and durability. The invention has other objects which are more specifically pointed out in the description following.

The wheel may be used for automobiles or vehicles or for pulleys or for any other purpose for which a wheel of this description is applicable.

The invention is illustrated in the accompanying drawings wherein—

Like numerals refer to like parts throughout the several figures.

Figure 1:
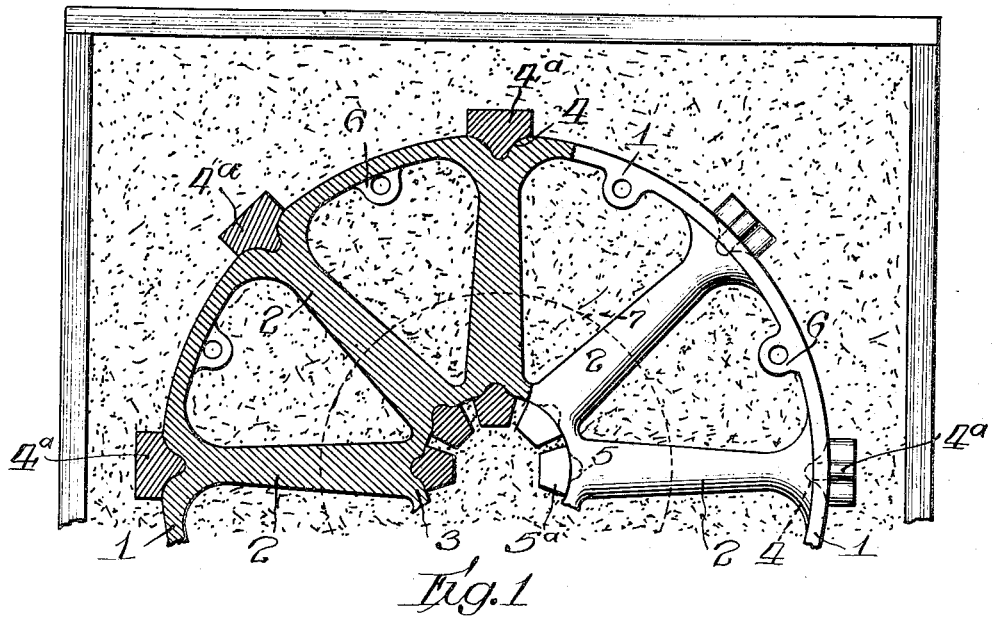
Figure 1 is a view showing one form of wheel in part section and in the flask in which it is molded illustrating the process of forming the wheel.
Figure 2:
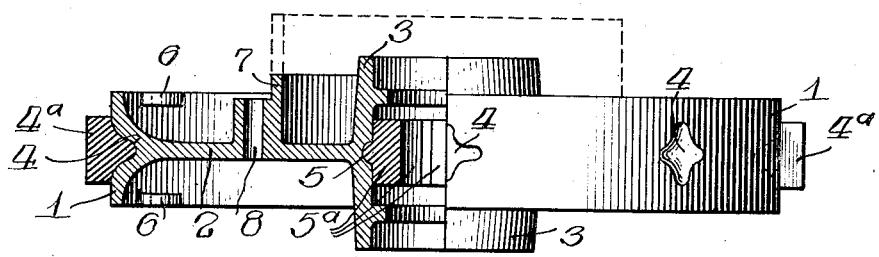
Fig. 2 is a peripheral view of the wheel, one half being in section.
Figure 3:
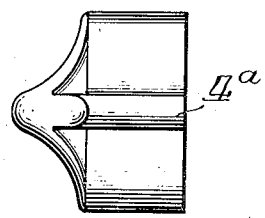
Fig. 3 is a side view of one of the chills used in forming the wheel.
Figure 4:
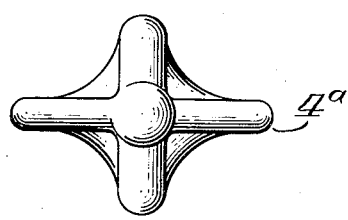
Fig. 4 is a face view of the chill shown in Fig. 3.

The wheel may be of any shape or size desired. In the construction shown I have illustrated the wheel having a rim 1, spokes 2, and a hub 3, the spokes being integrally connected with the rim and hub. At the points where the spokes are connected with the rim there is a larger mass or amount of metal and it is this larger mass or amount of metal that causes the difficulty in the ordinary wheel as it causes an unequal cooling, thus producing excessive internal stresses at these points. The same condition prevails at the hub ends of the spokes.

In carrying out my invention I provide on the face of the rim of the wheel opposite the points where the spokes connect therewith, recesses 4 and these recesses are preferably arranged with a view of reducing the excessive metal at these points so as to do away with the inequalities as to the amount of metal. These recesses are produced at the time the wheel is formed or molded. I prefer to simultaneously chill the metal at these points as I find that by reducing the amount of metal and simultaneously chilling it at the reduced portion I am able to secure the best results and make a wheel which is substantially free from excessive internal stresses at these points. In order to simultaneously form the recesses and chill the metal I provide in the mold chills $4^a$ at these points.

I prefer to provide at the hub ends of the spokes similar recesses 5 and similar chills $5^a$ so as to secure a similar result at these points. By properly proportioning the recesses and the chilling effect I am able to secure a wheel which is lighter than the ordinary wheel and which at the same time is very much stronger due to the fact that it is free from excessive internal stresses at the points where the spokes connect with the rim and the hub. The chilling effect may be controlled in any desired manner, as by means of the size of the chill with which the recesses are formed.

When the wheel is used for holding on certain detachable and demountable types of tires the rim is provided with lugs 6 so that the proper attachment by means of bolts or the like may be secured. These lugs are not necessary for the press-on type of tire. I may also provide the wheel with a flange 7 constructed to receive a brake drum, sprocket or gear, as desired. These parts may be integral with the wheel or may be separate therefrom and attached thereto by suitable fastening devices or bolts which enter holes 8 in this flange.

The hub 3, which is integral with the spokes, may be of any desired shape and form to receive the necessary bearing, axle or spindle.

I have described in detail a particular construction embodying the invention, but it is of course evident that the parts may be varied in many particulars without departing from the spirit of the invention as embodied in the claims hereto appended, and I therefore do not limit myself to the particular process or construction illustrated.

I claim:

1. The process of forming cast metal wheels which consist in casting the spokes, rim and hub integral the spokes and rim being cast solid and at the time of casting, forming separated recesses in the exterior of the rim at the points where the spokes connect with said rim, so as to reduce the internal stresses at these points.

2. The process of forming cast metal wheels which consist in casting the spokes, rim and hub integral and at the time of casting, forming separated recesses in the exterior of the rim at the points where the spokes connect with said rim, and simultaneously chilling the metal at the points where said recesses are formed, so as to reduce the internal stresses at these points.

3. The process of forming cast metal wheels which consist in casting the spokes, rim and hub integral and at the time of casting, forming separated recesses in the exterior of the rim at the points where the spokes connect with said rim and where the spokes connect with the hub, and simultaneously chilling the metal at the points where said recesses are formed, so as to reduce the internal stresses at these points.

4. A cast metal wheel comprising a rim, a hub and a series of solid spokes integral with said rim and hub, said rim being provided with a series of separated recesses on the periphery thereof and extending inwardly at the points where the spokes connect with said rim, whereby a wheel with reduced internal stresses at the points where the spokes connect with the rim is produced.

5. A cast metal wheel comprising a rim, a hub, a series of solid spokes integral with said rim and hub, said rim being provided with a series of separated recesses located on the periphery thereof and extending inwardly at the points where the spokes connect with the rim, the hub of said wheel being hollow and being also provided with a series of recesses extending inwardly at the points where the spokes connect with said hub, whereby a wheel with reduced internal stresses at the points where the spokes connect with the rim and hub is provided.

In testimony whereof, I affix my signature this 13th day of September, 1919.

WILLIAM R. GILMORE.